United States Patent
Kubota et al.

(10) Patent No.: US 11,936,247 B2
(45) Date of Patent: Mar. 19, 2024

(54) ROTOR, ROTATING ELECTRIC MACHINE, METHOD OF MANUFACTURING ROTOR, AND MAGNET

(71) Applicant: HONDA MOTOR CO., LTD., Tokyo (JP)

(72) Inventors: Yoshihisa Kubota, Wako (JP); Tadanobu Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 17/679,146

(22) Filed: Feb. 24, 2022

(65) Prior Publication Data

US 2022/0294292 A1    Sep. 15, 2022

(30) Foreign Application Priority Data

Mar. 11, 2021    (JP) ................. 2021-039642

(51) Int. Cl.
| | |
|---|---|
| *H02K 1/27* | (2022.01) |
| *H02K 1/276* | (2022.01) |
| *H02K 1/28* | (2006.01) |
| *H02K 15/03* | (2006.01) |
| *H02K 15/12* | (2006.01) |
| *H02K 21/14* | (2006.01) |

(52) U.S. Cl.
CPC .............. *H02K 1/28* (2013.01); *H02K 1/276* (2013.01); *H02K 15/03* (2013.01); *H02K 15/12* (2013.01); *H02K 21/14* (2013.01)

(58) Field of Classification Search
CPC .......... H02K 1/28; H02K 1/276; H02K 15/03; H02K 15/12; H02K 21/14; H02K 1/2766; H02K 1/16; H02K 1/22; H02K 2201/09
See application file for complete search history.

(56) References Cited

U.S. PATENT DOCUMENTS

| | | | |
|---|---|---|---|
| 2014/0077652 A1* | 3/2014 | Yamagishi | H02K 1/2766 310/156.21 |
| 2015/0303749 A1* | 10/2015 | Okubo | H02K 21/14 310/156.38 |
| 2019/0326042 A1* | 10/2019 | Takagi | C09J 5/06 |

FOREIGN PATENT DOCUMENTS

| | | |
|---|---|---|
| JP | 2015-089169 | 5/2015 |
| JP | 5748911 | 7/2015 |
| JP | 2020010466 A * | 1/2020 |

* cited by examiner

*Primary Examiner* — Thomas Truong
(74) *Attorney, Agent, or Firm* — Amin, Turocy & Watson, LLP

(57) ABSTRACT

A rotor of the present invention includes a rotor core, and a magnet press-fitted into a magnet insertion hole provided in the rotor core, the magnet has a hard magnetic body and a resin layer that is laminated on the hard magnetic body, that is disposed on an outward side of the rotor core in a radial direction and that includes a soft magnetic body, and the resin layer has a groove portion extending in a direction crossing an insertion direction.

7 Claims, 4 Drawing Sheets

ROTOR, ROTATING ELECTRIC MACHINE, METHOD OF MANUFACTURING ROTOR, AND MAGNET

CROSS-REFERENCE TO RELATED APPLICATION

Priority is claimed on Japanese Patent Application No. 2021-039642, filed Mar. 11, 2021, the content of which is incorporated herein by reference.

BACKGROUND OF THE INVENTION

Field of the Invention

The present invention relates to a rotor, a rotating electric machine, a method of manufacturing the rotor, and a magnet.

Description of Related Art

A magnet-embedded rotating electric machine (a so-called interior permanent magnet (IPM) motor) having a rotor core in which a permanent magnet is embedded is known. In a rotor used in the magnet-embedded rotating electric machine, various technologies having a structure configured to stably fix a permanent magnet have been proposed.

For example, Japanese Patent No. 5748911 discloses a method of fixing a magnet insertion hole of a rotor core and a permanent magnet using an adhesive agent. Iron powder as a soft magnetic material is mixed with the adhesive agent.

Japanese Unexamined Patent Application, First Publication No. 2015-089169 discloses a configuration in which a magnet obtained by providing a skin layer formed of a resin material on a surface of a permanent magnet is inserted into a magnet insertion hole of a rotor core heated to a melting temperature or more at which the resin material melts.

SUMMARY OF THE INVENTION

However, in the method disclosed in Japanese Patent No. 5748911, when an adhesive agent is injected into a gap between the magnet insertion hole and the permanent magnet, a resin containing iron powder may leak to both side portions of the magnet, leading to a decrease in torque density.

In addition, in the method disclosed in Japanese Unexamined Patent Application, First Publication No. 2015-089169, the permanent magnet is strongly fixed to the rotor core using an epoxy resin or the like having a thermosetting property and insulation as a resin material. However, when achieving faster rotation of the motor, a gap may occur between the permanent magnet and the magnet insertion hole due to peeling off of the resin layer.

An aspect of the present invention is directed to providing a rotor, a rotating electric machine, a method of manufacturing the rotor, and a magnet in which a gap occurring between a magnet and a magnet insertion hole is able to be eliminated and performance with regard to a torque, output, or the like, are able to be improved using a magnet with good dimensional accuracy.

(1) A rotor according to an aspect of the present invention includes a rotor core; and a magnet press-fitted into a magnet insertion hole provided in the rotor core, wherein the magnet has: a hard magnetic body; and a resin layer that is laminated on the hard magnetic body, that is disposed on an outward side of the rotor core in a radial direction and that contains a soft magnetic body, the resin layer having a groove portion extending in a direction crossing an insertion direction.

(2) In the rotor according to the aspect of the present invention, the resin layer may have an inclined portion with a surface that is inclined to widen from a downstream side toward an upstream side in the insertion direction.

(3) In the rotor according to the aspect of the present invention, the resin layer may contain a foaming agent.

(4) In the rotor according to the aspect of the present invention, the resin layer may be of a semi-cured resin.

(5) In the rotor according to the aspect of the present invention, the magnet insertion hole may be produced in an arc shape that protrudes toward a central axis of the rotor core, and the magnet may be provided in an arc shape having same arc center as the magnet insertion hole.

(6) A rotating electric machine according to another aspect of the present invention includes the rotor according to any one of the above-mentioned (1) to (5); and a stator disposed with a gap with respect to the rotor on an outward side in the radial direction.

(7) In a method of manufacturing a rotor according to another aspect of the present invention, the rotor includes: a rotor core; and a magnet press-fitted into a magnet insertion hole provided in the rotor core, the magnet having: a hard magnetic body; and a resin layer that is laminated on the hard magnetic body, that is disposed on an outward side of the rotor core in a radial direction and that contains a soft magnetic body, the resin layer having a groove portion in a direction crossing an insertion direction, and the method of manufacturing a rotor includes: a magnet insertion process of bringing the hard magnetic body into contact with an inner side surface of the magnet insertion hole in a radial direction, and pressing-fitting the magnet into the magnet insertion hole while bringing at least a part of the resin layer into contact with an outward side surface of the magnet insertion hole in the radial direction.

(8) In a method of manufacturing a rotor according to another aspect of the present invention, the rotor includes: a rotor core; and a magnet press-fitted into a magnet insertion hole provided in the rotor core, the magnet having: a hard magnetic body; and a resin layer that is laminated on the hard magnetic body, that is disposed on an outward side of the rotor core in a radial direction and that contains a soft magnetic body, the resin layer having a groove portion in a direction crossing an insertion direction, and the method of manufacturing a rotor includes: a magnet insertion hole heating process of heating at least an outward side surface of the magnet insertion hole in the radial direction among a circumferential surface of the magnet insertion hole to a predetermined temperature; and a magnet insertion process of, after the magnet insertion hole heating process, bringing the hard magnetic body into contact with an inner side surface of the magnet insertion hole in the radial direction, and press-fitting the magnet into the magnet insertion hole while bringing at least a part of the resin layer in contact with an outward side surface of the magnet insertion hole in the radial direction.

(9) In the method of manufacturing the rotor according to the other aspect of the present invention, the resin layer may contain a foaming agent, and the method of manufacturing the rotor may include: a heating foaming process of, after the magnet insertion process, heating the rotor core and foaming the foaming agent.

(10) In the method of manufacturing the rotor according to the other aspect of the present invention, the resin layer may have an inclined portion with a surface that is inclined to be widened from a downstream side toward an upstream side in an insertion direction, and in the magnet insertion process, the magnet may be press-fitted into the magnet insertion hole from the inclined portion.

(11) In the method of manufacturing the rotor according to the other aspect of the present invention, the resin layer may be a semi-cured resin.

(12) A magnet according to another aspect of the present invention is a magnet in a rotor having a rotor core, and press-fitted into a magnet insertion hole provided in the rotor core, the magnet including: a hard magnetic body; and a resin layer that is laminated on the hard magnetic body, that is disposed on an outward side of the rotor core in a radial direction and that contains a soft magnetic body, wherein the resin layer has a groove portion extending in a direction crossing an insertion direction.

In the configuration of the aspect of the above-mentioned (1), since the resin layer having the groove portion in the direction crossing the insertion direction is formed on the magnet, the magnet is press-fitted into the magnet insertion hole while shaving the resin layer between the groove portion and the groove portion. For this reason, in the configuration, in comparison with the magnet including the resin layer with no groove portion in the direction crossing the insertion direction, the magnet can be press-fitted into the magnet insertion hole. Then, since the resin layer containing the soft magnetic body is interposed in the gap between the hard magnetic body of the magnet and the magnet insertion hole, unlike in the method of injecting the resin containing the adhesive agent, the resin does not leak to both side portions of the magnet, and a decrease in torque density can be minimized.

According to the above-mentioned configuration, since the magnet is press-fitted into the magnet insertion hole while shaving the resin layer between the groove portion and the groove portion and the remainder (shavings) of the resin layer enters the groove portion on an upstream side, galling can be minimized. In addition, since the remainder of the resin layer enters the groove portion on the upstream side, occurrence of dust due to the remainder of the resin layer can be minimized.

In the configuration of the aspect of the above-mentioned (2), since the resin layer has the inclined portion with the surface that is inclined to be widened from the downstream side toward the upstream side in the insertion direction, an end portion of the magnet on the downstream side in the insertion direction can be easily guided to the magnet insertion hole, work of press-fitting the magnet into the magnet insertion hole can be easily performed.

In the configuration of the aspect of the above-mentioned (3), since the resin layer contains the foaming agent, the resin layer can be expanded to foam the foaming agent, the gap occurring between the hard magnetic body of the magnet and the magnet insertion hole can be reduced. In addition, the resin layer can be expanded to foam the foaming agent, and the groove portion or the inclined portion formed on the resin layer can be filled.

In the configuration of the aspect of the above-mentioned (4), since the resin layer is the semi-cured resin, in comparison with the case in which the resin with high hardness is used, pressing-fitting of the magnet into the magnet insertion hole can be easily performed.

In the configuration of the aspect of the above-mentioned (5), the magnet insertion hole and the magnet are provided in an arc shape. For this reason, the resin layer faces the outer circumferential surface of the magnet insertion hole in the radial direction. That is, since the resin layer is disposed on the inner side of the arc, when the magnet is press-fitted into the magnet insertion hole, the remainder of the resin layer enters the inner side of the arc, and scattering of the remainder (shavings) of the resin layer can be minimized.

In the configuration of the aspect of the above-mentioned (6), since the rotor in which the gap occurring between the magnet and the magnet insertion hole is eliminated by the magnet with good dimensional accuracy is provided, it is possible to provide a rotating electric machine capable of improving performance such as torque, output, or the like.

In the configuration of the aspect of the above-mentioned (7), in the magnet insertion process, the hard magnetic body comes in contact with the inner side surface of the magnet insertion hole in the radial direction, and the magnet is press-fitted into the magnet insertion hole while at least a part of the resin layer comes in contact with the outward side surface of the magnet insertion hole in the radial direction. Since the magnet insertion process is provided, the magnet can be press-fitted into the magnet insertion hole while shaving the resin layer between the groove portion and the groove portion. Then, according to the configuration, since the resin layer containing the soft magnetic body is interposed in the gap between the hard magnetic body of the magnet and the magnet insertion hole, like the method of injecting the resin containing the adhesive agent, the resin does not leak to both side portions of the magnet, any decrease in torque density can be minimized.

According to the configuration of the above-mentioned aspect, since the magnet is press-fitted into the magnet insertion hole while shaving the resin layer between the groove portion and the groove portion and the remainder (shavings) of the resin layer enters the groove portion on the upstream side, galling can be minimized. In addition, since the remainder (shavings) of the resin layer enters the groove portion on the upstream side, occurrence of dust due to the remainder of the resin layer can be minimized.

In the configuration of the aspect of the above-mentioned (8), after the magnet insertion hole heating process, the magnet insertion process is provided. Due to the magnet insertion hole heating process, the circumferential surface of the magnet insertion hole reaches a high temperature. When the magnet is inserted into the magnet insertion hole with a high temperature, the resin layer is melted and softened. Specifically, a part of the resin layer that cannot be inserted into the magnet insertion hole is melted at an upstream edge of the magnet insertion hole and stripped off. Alternatively, the part of the resin layer that cannot be inserted into the magnet insertion hole enters the groove portion on the upstream side. Accordingly, according to the configuration, since the resin layer can be manufactured without considering the thickness of the resin layer that fills the gap between the hard magnetic body of the magnet and the magnet insertion hole, manufacturing costs can be minimized.

In the configuration of the aspect of the above-mentioned (9), after the magnet insertion process, the heating foaming process of heating the rotor core and foaming the foaming agent is provided. The resin layer can be expanded by foaming the foaming agent, and the gap occurred between the hard magnetic body of the magnet and the magnet insertion hole can be minimized. In addition, the resin layer can be expanded by foaming the foaming agent, and the groove portion formed in the resin layer can be filled.

In the configuration of the aspect of the above-mentioned (10), since the resin layer has the inclined portion with the surface that is inclined to be widened from the downstream side toward the upstream side in the insertion direction, the end portion of the magnet on the downstream side in the insertion direction can be easily guided to the magnet insertion hole, and work of press-fitting the magnet into the magnet insertion hole can be easily performed.

In the configuration of the aspect of the above-mentioned (11), since the resin layer is a semi-cured resin, in comparison with the case in which the resin with high hardness is used, insertion into the magnet insertion hole can be easily performed.

In the configuration of the aspect of the above-mentioned (12), since the resin layer having the groove portion in the direction crossing the insertion direction is formed on the magnet, when the magnet is press-fitted into the magnet insertion hole provided in the rotor core, the magnet can be press-fitted into the magnet insertion hole while shaving the resin layer between the groove portion and the groove portion. For this reason, in the above-mentioned configuration, in comparison with the magnet including the resin layer with no groove portion in the direction crossing the insertion direction, the magnet can be easily press-fitted into the magnet insertion hole. Then, since the resin layer containing the soft magnetic body is interposed in the gap between the hard magnetic body of the magnet and the magnet insertion hole, like the method of injecting the resin containing the adhesive agent, the resin does not leak to both side portions of the magnet, a decrease in torque density can be minimized.

According to the configuration of the aspect, since the magnet is press-fitted into the magnet insertion hole while shaving the resin layer between the groove portion and the groove portion and the remainder (shavings) of the resin layer enters the groove portion on the upstream side, galling can be minimized. In addition, since the remainder (shavings) of the resin layer enters the groove portion on the upstream side, occurrence of dust due to the remainder of the resin layer can be minimized.

According to the aspect of the present invention, it is possible to provide a rotor, a rotating electric machine, a method of manufacturing the rotor, and a magnet that are capable of eliminating a gap occurred between a magnet and a magnet insertion hole and improving performance such as torque, output, or the like, by using a magnet with good dimensional accuracy.

DETAILED DESCRIPTION OF THE INVENTION

Hereinafter, an embodiment of the present invention will be described with reference to the accompanying drawings. In the embodiment, a rotating electric machine mounted on a vehicle such as a hybrid automobile, an electric automobile, or the like, will be exemplarily described.

<Rotating Electric Machine>

Figure 1:
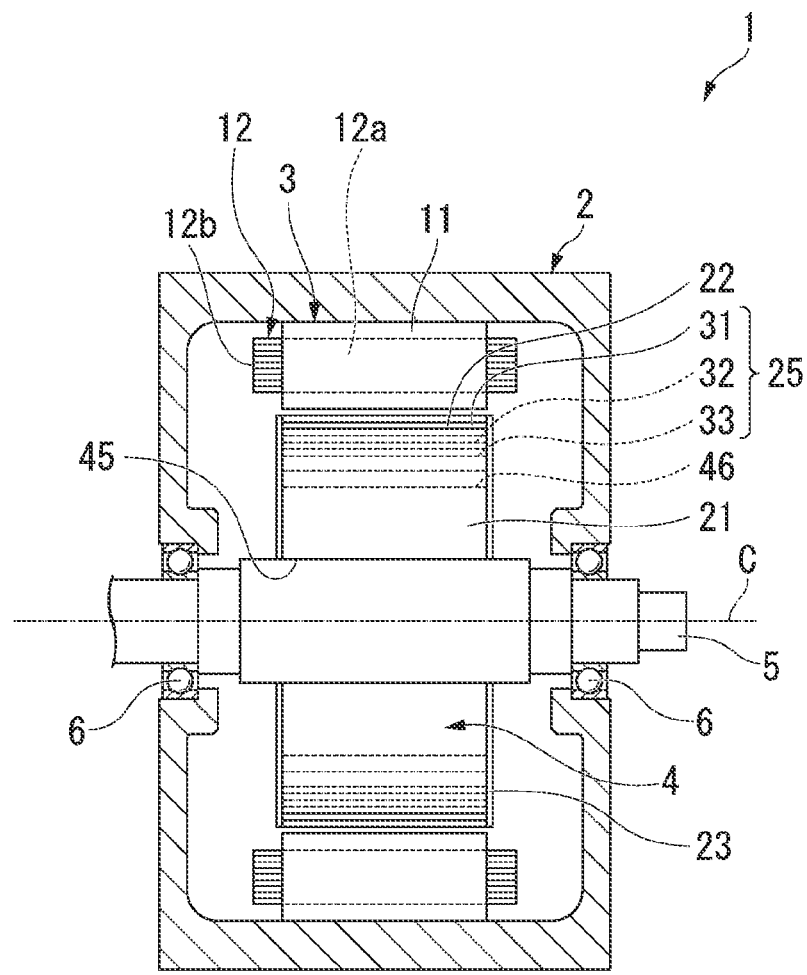
FIG. 1 is a cross-sectional view of a rotating electric machine according to an embodiment of the present invention.

FIG. 1 is a schematic configuration view showing the entire configuration of a rotating electric machine 1 according to an embodiment. FIG. 1 is a view showing a cross section cut along a virtual plane including an axis C.

As shown in FIG. 1, the rotating electric machine 1 includes a case 2, a stator 3, a rotor 4, and a shaft 5.

The case 2 is formed in a tubular box shape that accommodates the stator 3 and the rotor 4. A coolant (not shown) is accommodated in the case 2. A part of the stator 3 is immersed in a coolant in the case 2. For example, as the coolant, an automatic transmission fluid (ATF) or the like that is a working fluid used in lubrication of a transmission, power transmission, or the like, is used.

The shaft 5 is rotatably supported by the case 2. The shaft 5 is rotatably supported with respect to the case 2 via a bearing 6 attached to the case 2. Hereinafter, a direction along the axis C of the shaft 5 is referred to as "an axial direction," a direction perpendicular to the axis C is referred to as "a radial direction," and a direction around the axis C is referred to as "a circumferential direction."

The stator 3 includes a stator core 11, and a plurality of layers of coils 12 mounted on the stator core 11.

The stator core 11 is formed in an annular shape disposed coaxially with the axis C. The stator core 11 is fixed to an inner circumferential surface of the case 2. For example, the stator core 11 is formed by stacking a plurality of electromagnetic steel plates (silicon steel plates) in the axial direction. Further, the stator core 11 may be a so-called pressed powder core formed by pressing a magnetic metal powder (soft magnetic powder).

The stator core 11 has slots 13 into which the coils 12 are inserted. The plurality of slots 13 are disposed at intervals in the circumferential direction. Each of the coils 12 includes an insertion portion 12a inserted into each of the slots 13 of the stator core 11, and a coil end portion 12b protruding from the stator core 11 in the axial direction. The stator core 11 generates a magnetic field as the current flows to the coils 12.

<Rotor>

The rotor 4 is disposed with an interval with respect to the stator 3 on an inner side in the radial direction. The rotor 4 is fixed to the shaft 5. The rotor 4 is configured to be rotatable around the axis C integrally with the shaft 5.

The rotor 4 includes a rotor core 21, a magnet 22, and an end surface plate 23.

(Rotor Core)

The rotor core 21 is formed in an annular shape disposed coaxially with the axis C. The shaft 5 is press-fitted and fixed into the rotor core 21 on the inner side in the radial direction. The rotor core 21 is formed by stacking a plurality of electromagnetic steel plates (silicon steel plates) in the axial direction. Further, the rotor core 21 may be a so-called pressed powder core formed by pressing magnetic metal powder (soft magnetic powder).

The rotor core 21 has a plurality of magnet insertion holes 25 passing through the rotor core 21 in the axial direction, an end rib 40, a shaft through-hole 45, and a weight-reducing hole 46.

The plurality of magnet insertion holes 25 are disposed in an outer circumferential portion of the rotor core 21 at intervals in the circumferential direction.

Figure 2:
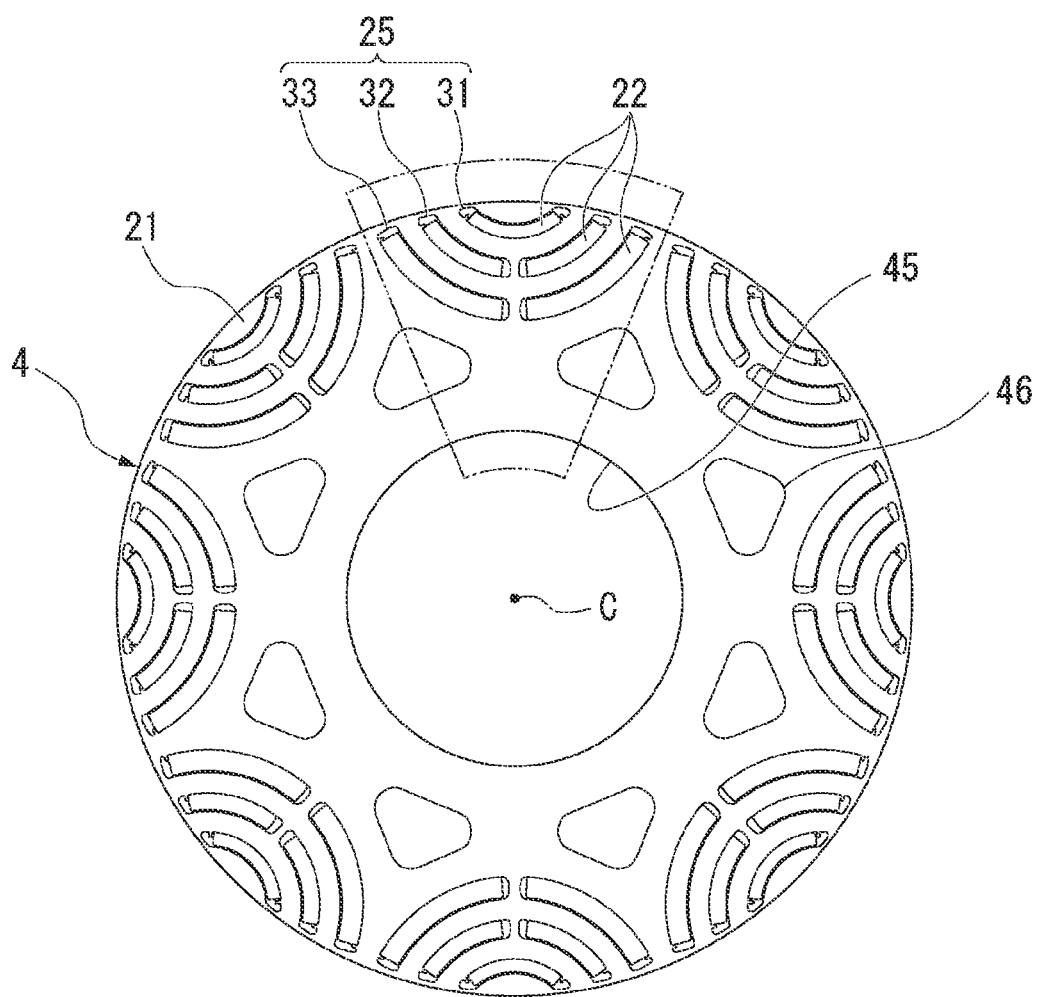
FIG. 2 is a front view of a rotor according to the embodiment of the present invention.
Figure 3:
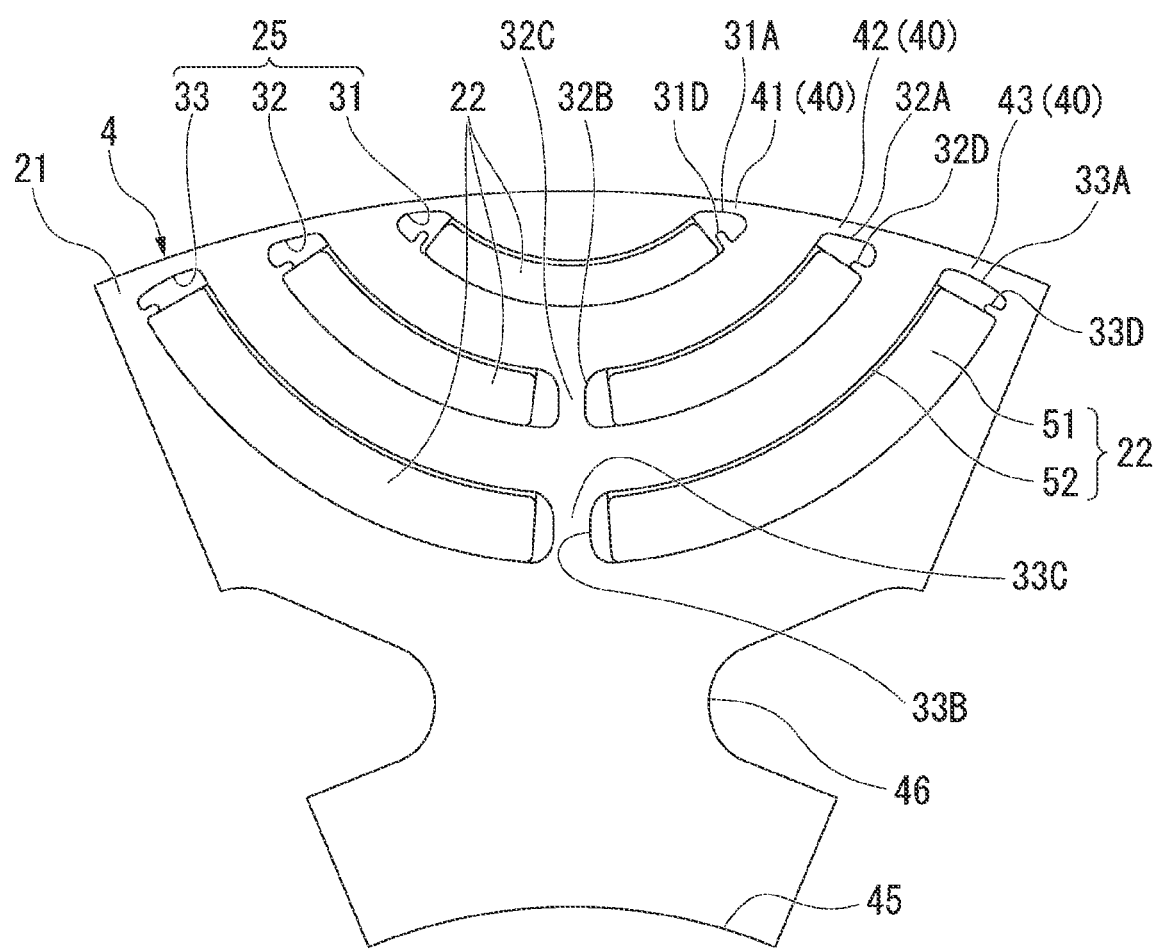
FIG. 3 is an enlarged view of a portion III in FIG. 2.

FIG. 2 is a view along an arrow II in FIG. 1 when the rotor 4 according to the embodiment is seen in the axial direction. In FIG. 2, illustration of the shaft 5, the end surface plate 23, and the like, is omitted. FIG. 3 is an enlarged view of a portion III in FIG. 2.

Each of the plurality of magnet insertion holes 25 has a first magnet insertion hole 31, a second magnet insertion hole 32, and a third magnet insertion hole 33. As shown in FIG. 2, in the embodiment, eight magnet insertion holes 25 are provided.

The first magnet insertion hole 31 is formed in an arc shape that protrudes toward the central axis of the rotor core 21 when seen in the axial direction. As shown in FIG. 3, both end portions of the first magnet insertion hole 31 are located on an inner side of the outer circumferential surface of the rotor core 21 in the radial direction. A first end portion 31A is provided on an outward side of the first magnet insertion hole 31 in the radial direction. The first end portion 31A smoothly connects an outer circumferential surface of the first magnet insertion hole 31 on an outward side in the radial direction and an inner circumferential surface of the first magnet insertion hole 31 on an inner side in the radial direction.

A first convex portion 31D is provided between the first end portion 31A and the inner circumferential surface of the first magnet insertion hole 31 on the inner side in the radial direction.

The second magnet insertion hole 32 is provided on an inner side of the first magnet insertion hole 31 in the radial direction. The pair of second magnet insertion holes 32 are parallelly provided in the circumferential direction so as to sandwich a first center rib 32C extending in the radial direction. The pair of second magnet insertion holes 32 are formed in an arc shape having the same curvature and arc center as the first magnet insertion hole 31 when seen in the axial direction.

In the end portions of the second magnet insertion hole 32, a second outer end portion 32A is provided on an outward side in the radial direction. In the end portions of the second magnet insertion hole 32, a second inner end portion 32B is provided on an inner side in the radial direction. The first center rib 32C is provided on the inner side of the pair of second inner end portions 32B in the circumferential direction. The second outer end portion 32A and the second inner end portion 32B smoothly connect the outer circumferential surface of second magnet insertion hole 32 on the outward side in the radial direction and the inner circumferential surface of the second magnet insertion hole 32 on the inner side in the radial direction.

A second convex portion 32D is provided between the second outer end portion 32A and the inner circumferential surface of the second magnet insertion hole 32 on the inner side in the radial direction.

The third magnet insertion hole 33 is provided on an inner side of the second magnet insertion hole 32 in the radial direction. The pair of third magnet insertion holes 33 are parallelly provided in the circumferential direction so as to sandwich a second center rib 33C extending in the radial direction. The pair of third magnet insertion holes 33 are formed in an arc shape having the same curvature and arc center as the first magnet insertion hole 31 and the second magnet insertion hole 32 when seen in the axial direction.

In end portions of the third magnet insertion hole 33, a third outer end portion 33A is provided on an outward side in the radial direction. In the end portions of the third magnet insertion hole 33, a third inner end portion 33B is provided on an inner side in the radial direction. The second center rib 33C is provided on the inner side of the pair of third inner end portions 33B in the circumferential direction. The third outer end portion 33A and the third inner end portion 33B smoothly connect the outer circumferential surface of the third magnet insertion hole 33 on the outward side in the radial direction and the inner circumferential surface of the third magnet insertion hole 33 on the inner side in the radial direction.

A third convex portion 33D is provided between the third outer end portion 33A and the inner circumferential surface of the third magnet insertion hole 33 on the inner side in the radial direction.

The end rib 40 is provided on a further outward side in the radial direction than the first end portion 31A, the second outer end portion 32A and the third outer end portion 33A that are disposed on the outward sides of the magnet insertion holes 25 in the radial direction. The end rib 40 has a first end rib 41, a second end rib 42, and a third end rib 43. The thicknesses of the first end rib 41, the second end rib 42, and the third end rib 43 in the radial direction are the same with each other when seen in the axial direction.

The first end rib 41 is provided between the outer circumferential surface of the rotor core 21 and the first end portion 31A of the first magnet insertion hole 31. The second end rib 42 is provided between the outer circumferential surface of the rotor core 21 and the second outer end portion 32A of the second magnet insertion hole 32. The third end rib 43 is provided between the outer circumferential surface of the rotor core 21 and the third outer end portion 33A of the third magnet insertion hole 33.

As shown in FIG. 2, the shaft through-hole 45 is disposed on an inner side of the magnet insertion hole 25 in the radial direction. The shaft through-hole 45 passes through the rotor core 21 in the axial direction. The shaft through-hole 45 is provided coaxially with the axis C. The shaft 5 is inserted through the shaft through-hole 45 (see FIG. 1). For example, the shaft 5 is press-fitted and fixed into the shaft through-hole 45.

As shown in FIG. 2, the weight-reducing hole 46 is provided between the magnet insertion hole 25 and the shaft through-hole 45 in the radial direction. The rotor core 21 passes through the weight-reducing hole 46 in the axial direction. The weight-reducing hole 46 is provided between the magnet insertion holes 25 neighboring in the circumferential direction. When seen in the axial direction, the weight-reducing hole 46 is formed in a triangular shape having an apex portion on an outward side in the radial direction. Inside of the weight-reducing hole 46 is formed such that, for example, a screw member (not shown) can pass therethrough.

The rotor core 21 can be reduced in weight by providing the weight-reducing hole 46. The weight-reducing hole 46 functions as a flux barrier.

(End Surface Plate)

The end surface plate 23 is disposed on both end portions in the axial direction with respect to the rotor core 21. The end surface plate 23 may at least cover the plurality of magnet insertion holes 25. The end surface plate 23 abuts an outer end surface of the rotor core 21 in the axial direction. The end surface plate 23 is press-fitted and fixed onto the shaft 5.

<Magnet>

Figure 4:
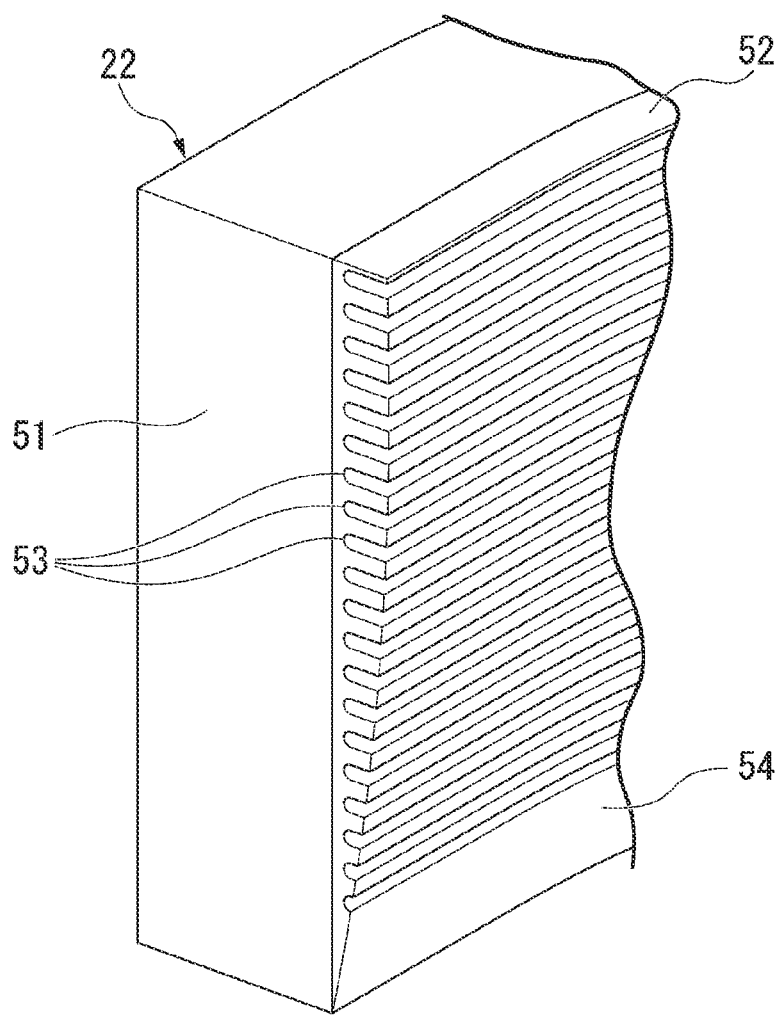
FIG. 4 is a perspective view of a magnet according to the embodiment of the present invention.

FIG. 4 is a perspective view of the magnet 22.

The magnet 22 is press-fitted into the magnet insertion holes 25. The magnet 22 has a hard magnetic body 51, and a resin layer 52 laminated on the hard magnetic body 51.

The magnet 22 is formed in an arc shape having the same curvature and arc center of each of the first magnet insertion hole 31, the second magnet insertion hole 32, and the third magnet insertion hole 33.

Hereinafter, in the description of the magnet 22, a downstream side in the insertion direction when the magnet 22 is inserted (press-fitted) into the magnet insertion holes 25 may be referred to as "a first side," and an upstream side in the insertion direction when the magnet 22 is inserted (press-fitted) into the magnet insertion holes 25 may be referred to as "a second side."

The hard magnetic body 51 is formed of a permanent magnet. The hard magnetic body 51 is disposed on an inner side of the magnet insertion holes 25 in the radial direction. Among the hard magnetic body 51 and the resin layer 52 provided in the magnet 22, at least the hard magnetic body 51 may be formed in an arc shape having the same curvature and arc center as the first magnet insertion hole 31, the second magnet insertion hole 32, and the third magnet insertion hole 33. An outer end portion of the hard magnetic body 51 in the circumferential direction comes in contact with the first convex portion 31D, the second convex portion 32D, and the third convex portion 33D.

In a state in which the magnet 22 is press-fitted into the magnet insertion holes 25, the resin layer 52 faces the outer circumferential surface of the arc-shaped magnet insertion holes 25 in the radial direction. In the embodiment, the resin layer 52 is located on an arc-shaped inner side of the magnet insertion hole 25.

The resin layer 52 has a groove portion 53 extending in a direction crossing an insertion direction into the magnet insertion hole 25. In the embodiment, the groove portion 53 is formed in a linear shape. The groove portion 53 may extend in a direction crossing the insertion direction or may be provided in a spiral shape. In the groove portion 53, the resin layer 52 is recessed in a U shape toward a surface of the hard magnetic body 51. A recessed depth of the groove portion 53 is gradually increased from a first side toward a second side of the magnet 22. The groove portion 53 may be formed by scraping the surface of the resin layer 52, or the groove portion 53 may be formed simultaneously with formation of the resin layer 52 by providing a concavo-convex portion on a mold.

The resin layer 52 has an inclined portion 54 with a surface that is inclined to be widened from a downstream side to an upstream side in the insertion direction. The inclined portion 54 may be provided on at least the first side of the magnet 22. In a place of the resin layer 52 where the inclined portion 54 is provided, the groove portion 53 is removed. The inclined portion 54 may be formed by scraping the surface of the resin layer 52, or the inclined portion 54 may be formed simultaneously with formation of the resin layer 52 by providing a concavo-convex portion on a mold. The order in which the groove portion 53 and the inclined portion 54 are formed does not matter.

The resin layer 52 is formed of a semi-cured resin. The semi-cured resin is preferably a thermoplastic resin or a thermosetting resin, more preferably a thermoplastic resin. In the embodiment, a thermoplastic epoxy resin or the like may be used as the semi-cured resin.

The resin layer 52 contains a foaming agent in the semi-cured resin. The foaming agent may have a composition that foams by heating.

<Method of Manufacturing Rotor>

Figure 5:
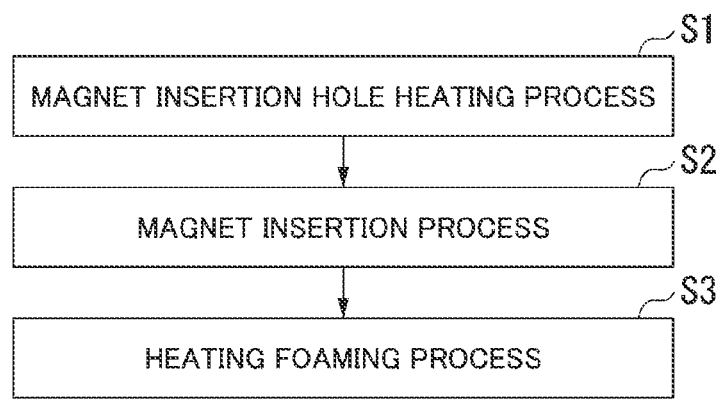
FIG. 5 is a flowchart showing a method of manufacturing the rotor according to the embodiment of the present invention.

Next, a method of manufacturing the above-mentioned rotor 4 will be described. FIG. 5 is a flowchart showing the method of manufacturing the rotor 4.

As shown in FIG. 5, the method of manufacturing the rotor 4 includes a magnet insertion hole heating process S1, a magnet insertion process S2, and a heating foaming process S3.

The magnet insertion hole heating process S1 is a process of heating at least an outer circumferential surface of the magnet insertion hole 25 on an outward side in the radial direction among the circumferential surface of the magnet insertion hole 25 to a predetermined temperature. In the embodiment, the predetermined temperature may be a temperature at which the resin layer 52 is softened or dissolved.

The magnet insertion process S2 is a process performed after the magnet insertion hole heating process S1. The magnet insertion process S2 is a process of bringing the hard magnetic body 51 in contact with the inner side surface of the magnet insertion hole 25 in the radial direction, and press-fitting the magnet 22 into the magnet insertion hole 25 while bringing at least a part of the resin layer 52 in contact with the outward side surface of the magnet insertion hole 25 in the radial direction. In the embodiment, the magnet 22 enters the magnet insertion hole 25 from a first side at which the inclined portion 54 is provided on the resin layer 52.

The heating foaming process S3 is a process performed after the magnet insertion process S2. The heating foaming process S3 is a process of heating the rotor core 21 and foaming a foaming agent contained in the resin layer 52. In the heating foaming process S3, the magnet 22 other than the rotor core 21 may be heated, and the foaming agent included in the resin layer 52 may be foamed. While the content of the foaming agent is not particularly limited, the foaming agent may contain, for example, an amount that fills the gap between the groove portion 53 and the inclined portion 54, and the magnet insertion holes 25.

In the embodiment, the method of manufacturing the rotor 4 including the magnet insertion hole heating process S1, the magnet insertion process S2, and the heating foaming process S3 has been described, there is no limitation thereto. The method of manufacturing the rotor 4 may include at least the magnet insertion process S2. In this case, the magnet 22 is press-fitted into the magnet insertion holes 25 while shaving the resin layer 52 between the groove portion 53 and the groove portion 53.

In addition, the method of manufacturing the rotor 4 may include the magnet insertion hole heating process S1 and the magnet insertion process S2 in sequence, or may include the magnet insertion process S2 and the heating foaming process S3 in sequence.

(Effects)

In the embodiment, since the resin layer 52 having the groove portion 53 is formed on the magnet 22 in the direction crossing the insertion direction, when the magnet 22 is press-fitted into the magnet insertion holes 25 provided in the rotor core 21, the magnet 22 can be press-fitted into the magnet insertion holes 25 while shaving the resin layer 52 between the groove portion 53 and the groove portion 53. For this reason, according to the embodiment, in comparison with the magnet 22 including the resin layer 52 with no groove portion 53 in the direction crossing the insertion direction, the magnet 22 can be easily press-fitted into the magnet insertion holes 25. Then, since the resin layer 52 containing the soft magnetic body is interposed in the gap between the hard magnetic body 51 of the magnet 22 and the magnet insertion holes 25, like the method of injecting the resin containing an adhesive agent, the resin does not leak to both side portions of the magnet 22, and a decrease in torque density can be minimized.

According to the embodiment, since the magnet 22 is press-fitted into the magnet insertion holes 25 while shaving the resin layer 52 between the groove portion 53 and the groove portion 53 and a remainder (shavings) of the resin layer 52 enters the groove portion 53 on an upstream side, galling can be minimized. In addition, since the remainder of the resin layer 52 enters the groove portion 53 on the upstream side, occurrence of dust due to the remainder of the resin layer 52 can be minimized.

In the embodiment, since the resin layer 52 has the inclined portion 54 with a surface that is inclined to be widened from the downstream side toward the upstream side in the insertion direction, an end portion of the magnet 22 on the downstream side in the insertion direction can be easily guided to the magnet insertion holes 25, a work of press-fitting the magnet 22 into the magnet insertion holes 25 can be easily performed.

In the embodiment, since the resin layer 52 contains the foaming agent, the resin layer 52 can be expanded by foaming the foaming agent, and the gap occurred between the hard magnetic body 51 of the magnet 22 and the magnet insertion holes 25 can be reduced. In addition, the resin layer 52 can be expanded by foaming the foaming agent, and the groove portion 53 formed in the resin layer 52 can be filled.

In the embodiment, since the resin layer 52 is the semi-cured resin, in comparison with the case in which a resin with high hardness is used, press-fitting of the magnet 22 into the magnet insertion holes 25 can be easily performed.

In the embodiment, the magnet insertion holes 25 and the magnet 22 are provided in an arc shape. For this reason, the resin layer 52 faces an outer circumferential surface of the magnet insertion hole 25 in the radial direction. That is, when the resin layer 52 is located on an inner side of the arc shape and the magnet 22 is press-fitted into the magnet insertion holes 25, the remainder of the resin layer 52 enters the arc shape, and scattering of the remainder (shavings) of the resin layer 52 can be minimized.

In the embodiment, in the magnet insertion process S2, the hard magnetic body 51 comes in contact with the inner side surface of the magnet insertion hole 25 in the radial direction, and the magnet 22 is press-fitted while at least a part of the resin layer 52 comes in contact with the outward side surface of the magnet insertion hole 25 in the radial direction. Since the magnet insertion process S2 is provided, the magnet 22 can be press-fitted into the magnet insertion holes 25 while shaving the resin layer 52 between the groove portion 53 and the groove portion 53. Then, according to the embodiment, since the resin layer 52 containing the soft magnetic body is interposed in the gap between the hard magnetic body 51 of the magnet 22 and the magnet insertion holes 25, like the method of injecting the resin containing the adhesive agent, the resin does not leak to both side portions of the magnet 22, and a decrease in torque density can be minimized.

According to the embodiment, since the magnet 22 is press-fitted into the magnet insertion holes 25 while shaving the resin layer 52 between the groove portion 53 and the groove portion 53, and the remainder (shavings) of the resin layer 52 enters the groove portion 53 on the upstream side, galling can be minimized. In addition, since the remainder (shavings) of the resin layer 52 enters the groove portion 53 on the upstream side, occurrence of dust due to the remainder of the resin layer 52 can be minimized.

In the embodiment, after the magnet insertion hole heating process 51, the magnet insertion process S2 is provided. The circumferential surface of the magnet insertion hole 25 is heated to a high temperature by the magnet insertion hole heating process 51. When the magnet 22 is inserted into the magnet insertion holes 25 with a high temperature, the resin layer 52 is melted and softened. A part of the resin layer 52 that cannot be inserted into the magnet insertion holes 25 is melted and scraped off at an upstream edge of the magnet insertion holes 25. Alternatively, the part of the resin layer 52 that cannot be inserted into the magnet insertion holes 25 enters the groove portion 53 on the upstream side. Accordingly, according to the embodiment, since the resin layer 52 can be manufactured without considering the thickness of the resin layer 52 that fills the gap between the hard magnetic body 51 of the magnet 22 and the magnet insertion holes 25, manufacturing costs can be minimized.

In the embodiment, after the magnet insertion process S2, the heating foaming process S3 of heating the rotor core 21 and foaming the foaming agent is provided. The resin layer 52 can be expanded by foaming the foaming agent, and the gap occurred between the hard magnetic body 51 of the magnet 22 and the magnet insertion holes 25 can be reduced. In addition, the resin layer 52 can be expanded by foaming the foaming agent, the groove portion 53 or the inclined portion 54 formed on the resin layer 52 can be filled.

In the embodiment, since the resin layer 52 has the inclined portion 54 with a surface that is inclined to be widened from the downstream side toward the upstream side in the insertion direction, the end portion of the magnet 22 on the downstream side (the first side) in the insertion direction can be easily guided to the magnet insertion holes 25, and a work of press-fitting the magnet 22 into the magnet insertion holes 25 can be easily performed.

In the embodiment, since the resin layer 52 is a semi-cured resin, in comparison with the case in which a resin with high hardness is used, insertion into the magnet insertion holes 25 can be easily performed.

As described above, according to the embodiment, it is possible to provide the rotor 4, the rotating electric machine 1, the method of manufacturing the rotor 4, and the magnet 22 that are capable of eliminating the gap generated by the magnet 22 and the magnet insertion holes 25 by using the magnet 22 with good dimensional accuracy, and to improve performance of the rotating electric machine 1 such as torque, output, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A rotor comprising:
a rotor core; and
a magnet press-fitted into a magnet insertion hole provided in the rotor core,
wherein the magnet has:
a hard magnetic body; and
a resin layer that is laminated on the hard magnetic body, that is disposed on an outward side of the rotor core in a radial direction and that contains a soft magnetic body, and
the resin layer has a plurality of groove portions extending in a direction crossing an insertion direction,
the plurality of groove portions are formed by recessing the resin layer toward a surface of the hard magnetic body, and
a recessed depth of the plurality of groove portions gradually increases from a first groove portion toward a second groove portion, the first groove portion being provided outermost at a first side of the resin layer which is at a downstream side in the insertion direction when the magnet is press-fitted into the magnet insertion hole and the second groove portion being provided outermost at a second side of the resin layer which is at an upstream side in the insertion direction when the magnet is press-fitted into the magnet insertion hole.

2. The rotor according to claim 1, wherein the resin layer has an inclined portion with a surface that is inclined to widen from the downstream side toward the upstream side in the insertion direction.

3. The rotor according to claim 1, wherein the resin layer contains a foaming agent.

4. The rotor according to claim 1, wherein the resin layer is a semi-cured resin.

5. The rotor according to claim 1, wherein the magnet insertion hole is produced in an arc shape that protrudes toward a central axis of the rotor core, and
the magnet is provided in an arc shape having same arc center as the magnet insertion hole.

6. A rotating electric machine comprising:
the rotor according to claim 1; and
a stator disposed with a gap with respect to the rotor on an outward side in the radial direction.

7. A magnet in a rotor having a rotor core, and press-fitted into a magnet insertion hole provided in the rotor core, the magnet comprising:
a hard magnetic body; and
a resin layer that is laminated on the hard magnetic body, that is disposed on an outward side of the rotor core in a radial direction and that contains a soft magnetic body,
wherein the resin layer has a plurality of groove portions extending in a direction crossing an insertion direction,
the plurality of groove portions are formed by recessing the resin layer toward a surface of the hard magnetic body, and
a recessed depth of the plurality of groove portions gradually increases from a first groove portion toward a second groove portion, the first groove portion being provided outermost at a first side of the resin layer which is at a downstream side in the insertion direction when the magnet is press-fitted into the magnet insertion hole and the second groove portion being provided outermost at a second side of the resin layer which is at an upstream side in the insertion direction when the magnet is press-fitted into the magnet insertion hole.

* * * * *